(12) United States Patent
Ebiko (10) Patent No.: US 9,033,010 B2
(45) Date of Patent: May 19, 2015

(54) PNEUMATIC TIRE HAVING RATIO OF ACTUAL SECTION HEIGHT TO CALCULATED SECTION HEIGHT

(75) Inventor: Masahiro Ebiko, Kanagawa (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 714 days.

(21) Appl. No.: 12/991,482

(22) PCT Filed: May 28, 2009

(86) PCT No.: PCT/JP2009/059744
§ 371 (c)(1),
(2), (4) Date: Nov. 8, 2010

(87) PCT Pub. No.: WO2009/150941
PCT Pub. Date: Dec. 17, 2009

(65) Prior Publication Data
US 2011/0056601 A1    Mar. 10, 2011

(30) Foreign Application Priority Data
Jun. 13, 2008 (JP) .................................. 2008-155731

(51) Int. Cl.
*B60C 9/28* (2006.01)
*B60C 11/11* (2006.01)
(Continued)

(52) U.S. Cl.
CPC .................. *B60C 9/28* (2013.01); *B60C 11/033* (2013.04); *B60C 2015/061* (2013.04);
(Continued)

(58) Field of Classification Search
CPC .............. B60C 11/0306; B60C 11/033; B60C 11/0332; B60C 11/11; B60C 11/12; B60C 11/0083; B60C 2011/0016; B60C 9/28; B60C 2015/061

USPC ............ 152/209.5, 209.18, DIG. 3, 902, 531, 152/533, 535, 536, 546
See application file for complete search history.

(56) References Cited

U.S. PATENT DOCUMENTS 4,985,100 A * 1/1991 Sasaki et al. ................ 156/110.1
5,733,393 A * 3/1998 Hubbell et al. ........... 152/209.18
(Continued)

FOREIGN PATENT DOCUMENTS

JP    62-268707 A  * 11/1987
JP    5-254310 A     10/1993
(Continued)

OTHER PUBLICATIONS machine translation for Japan 2000-225814 (no. date).*
(Continued)

*Primary Examiner* — Steven D Maki
(74) *Attorney, Agent, or Firm* — Carrier Blackman & Associates, P.C.; Joseph P. Carrier; Fulchand P. Shende (57) ABSTRACT

A pneumatic tire in which: a carcass layer is laid between paired bead sections; a belt layer is buried, on the outer peripheral side of the carcass layer, in a tread section; and multiple main grooves extending in a tire circumferential direction are provided in the tread section. In the pneumatic tire, a maximum groove depth of each of the main grooves is 8.5 mm to 15.0 mm, a ratio $\alpha$ of a section height SH of an actual tire to a section height $SH_{std}$ calculated from a tire size is set in a range of $0.97 \leq \alpha \leq 0.99$, a contact area ratio is 65% to 70% under a measurement condition where an air pressure is 200 kPa and a load is 50% of a load carrying ability with the air pressure of 200 kPa, and an average contact pressure P is 300 kPa to 400 kPa under the measurement condition. The tire achieves enhanced wet performance without increasing tire weight.

17 Claims, 3 Drawing Sheets

(51) Int. Cl.
- *B60C 11/12* (2006.01)
- *B60C 15/06* (2006.01)
- *B60C 11/03* (2006.01)
- *B60C 9/09* (2006.01)
- *B60C 11/00* (2006.01)
- *B60C 15/00* (2006.01)

(52) U.S. Cl.
CPC ............... *B60C 11/11* (2013.01); *B60C 9/09* (2013.01); *B60C 11/0083* (2013.04); *B60C 11/0306* (2013.04); *B60C 11/0332* (2013.04); *B60C 11/12* (2013.01); *B60C 15/0018* (2013.04); *B60C 2011/1209* (2013.04); *B60C 2011/0025* (2013.04); *B60C 11/005* (2013.01)

(56) References Cited

U.S. PATENT DOCUMENTS

| | | | |
|---|---|---|---|
| 6,378,583 B1 * | 4/2002 | Fontaine | 152/209.21 |
| 6,439,285 B1 * | 8/2002 | Elkurd et al. | 152/DIG. 3 |
| 6,443,199 B1 * | 9/2002 | Scarpitti et al. | 152/209.1 |
| 7,810,535 B2 * | 10/2010 | Kojima | 152/546 |
| 2004/0238092 A1 * | 12/2004 | Colombo et al. | 152/209.15 |
| 2004/0238094 A1 * | 12/2004 | Kajita | 152/546 |
| 2005/0092413 A1 * | 5/2005 | Miyazaki | 152/209.24 |
| 2006/0118222 A1 * | 6/2006 | Ebiko | 152/209.28 |
| 2006/0180259 A1 * | 8/2006 | Kajita | 152/541 |
| 2008/0105347 A1 * | 5/2008 | Matsunaga et al. | 152/209.14 |

FOREIGN PATENT DOCUMENTS

| | | | |
|---|---|---|---|
| JP | 7-081305 A | | 3/1995 |
| JP | 2000-168316 A | | 6/2000 |
| JP | 2000-185526 A | | 7/2000 |
| JP | 2000-225814 | * | 8/2000 |
| JP | 2005-138739 A | * | 6/2005 |
| JP | 2006-111122 A | | 4/2006 |
| JP | 2008-126945 | * | 6/2008 |
| WO | 2009-078425 A1 | | 6/2009 |

OTHER PUBLICATIONS

Machine translation for Japan 2005-138739 (no date).*

* cited by examiner

PNEUMATIC TIRE HAVING RATIO OF ACTUAL SECTION HEIGHT TO CALCULATED SECTION HEIGHT

TECHNICAL FIELD

The present invention relates to a pneumatic tire suitable when an emphasis is placed on wear life. More specifically, the present invention relates to a pneumatic tire whose wear life can be extended, and whose wet braking performance can be enhanced, without increasing the weight of the tire.

BACKGROUND ART

There has been a demand for extended wear life of pneumatic tires. On the other hand, a demand for weight reduction of tires is also strong due to reasons such as reducing an environmental load, reducing manufacturing costs, and improving riding comfort. Generally, the wear life is extended by using a method of increasing a design width of a tread section, a method of decreasing the groove area of the tread section, and a method of increasing the thickness of the tread section thereby increasing the groove depth (for example, see Patent Document 1). Nevertheless, these methods entail increase in the tire weight. For this reason, it is difficult to achieve both the extension of the wear life and the reduction of the tire weight at the same time.

Furthermore, there is recently a strong demand for improving wet braking performance at a running speed exceeding 100 km/h to cope with the increasing speed of vehicles. If the groove area ratio in the tread section is increased in view of such a demand, the wear life is further reduced.

PRIOR ART DOCUMENT

Patent Document

Patent Document 1: Japanese patent application Kokai publication No. 2006-111122

SUMMARY OF THE INVENTION

Problem to be Solved by the Invention

An object of the present invention is to provide a pneumatic tire whose wear life can be extended, and whose wet braking performance can be enhanced, without increasing the weight of the tire.

Means for Solving the Problem

To achieve the above object, the pneumatic tire is a pneumatic tire in which: a carcass layer is laid between paired bead sections; a belt layer is buried, on the outer peripheral side of the carcass layer, in a tread section; and a plurality of main grooves extending in a tire circumferential direction are provided in the tread section, the pneumatic tire characterized in that a maximum groove depth of each of the main grooves is 8.5 mm to 15.0 mm, a ratio $\alpha$ of a section height SH of an actual tire to a section height $SH_{std}$ calculated from a tire size is set in a range of $0.97 \leq \alpha \leq 0.99$, a contact area ratio is 65% to 70% under a measurement condition where an air pressure is 200 kPa and a load is 50% of a load carrying ability with the air pressure of 200 kPa, and an average contact pressure P is 300 kPa to 400 kPa under the measurement condition.

Effects of the Invention

In the present invention, while the maximum groove depth of main grooves are made relatively large, the average contact pressure P is made to be larger than conventional tires by setting the section height SH of the actual tire relatively small; and optimizing the contact area ratio under a predetermined measurement condition. This makes it possible to extend the wear life and enhance the wet braking performance, without increasing the weight of the tire.

In the present invention, it is desirable that the following configurations should be satisfied for the purpose of achieving a high level of balance between the reduction of the tire weight, the extension of the wear life, and the enhancement of the wet braking performance.

Specifically, a JIS-A hardness of a cap compound constituting the tread section is preferably 50 to 68 at 23° C. An aspect ratio is preferably 65% to 85%, and a ratio $\beta$ of a maximum contact width GCW to a tire section width SW is preferably in a range of $0.60 \leq \beta \leq 0.70$. A maximum footprint length Ls of shoulder land portions situated in respective shoulders of the tread section and a maximum footprint length Lc of a center land portion situated in a center of the tread section preferably satisfy a relationship of $0.80 \leq Ls/Lc \leq 0.95$. The section height SH of the actual tire is preferably 150 mm to 200 mm. An average tread radius R measured along a tire meridian and a tire outside diameter D preferably satisfy a relationship of $0.70 \leq R/D \leq 0.90$.

The pneumatic tire preferably includes two belt layers in the tread section, and a crossing angle of cords of these belt layers is preferably 44° to 52°. The pneumatic tire preferably includes two belt layers in the tread section, and a width BW of a portion where these belt layers overlap each other and the maximum contact width GCW preferably satisfy a relationship of $0.90 \leq BW/GCW \leq 1.00$.

The pneumatic tire preferably includes a bead filler on a bead core in each of the bead sections, and a height H of each bead filler from a bead heel and the section height SH of the actual tire preferably satisfy a relationship of $0.20 \leq H/SH \leq 0.30$.

The pneumatic tire preferably includes four main grooves in the tread section, each main groove having a see-through structure, a distance A1L from a center position of one of the main grooves A1 situated on the tire equator side to the tire equator and the maximum contact width GCW preferably satisfy a relationship of $0.05 \leq A1L/GCW \leq 0.15$, and a distance A2L from a center position of one of the main grooves A2 situated on each shoulder side to the tire equator and the maximum contact width GCW preferably satisfy a relationship of $0.25 \leq A2L/GCW \leq 0.40$.

The pneumatic tire preferably includes a belt cover layer on an outer peripheral side of the belt layers in the tread section, one end portion of the belt cover layer is preferably placed outward of the belt layers in a tire width direction, and the other end portion of the belt cover layer is preferably placed in a region under a land portion defined by one of the tire equator-side main grooves A1 and the corresponding shoulder-side main groove A2.

The pneumatic tire preferably includes a plurality of lug grooves connecting the tire equator-side main grooves A1 and the shoulder-side main grooves A2, a center line of each lug groove preferably includes two straight lines which cross each other, a crossing angle A1θ between the center line of the lug groove and the corresponding main groove A1 is preferably 40° to 60°, and a crossing angle A2θ between the center line of the lug groove and the corresponding main groove A2 is preferably 60° to 80°.

Each of five rows of land portions defined by the main grooves is preferably made up of a plurality of blocks; a sipe is preferably arranged in each of these blocks; in each block formed between the tire equator-side main grooves A1, A1, the sipe is preferably terminated at the one end in the block and is made to communicate at the other end with one of the main grooves A1; in each block formed between one of the tire equator-side main grooves A1 and the corresponding shoulder-side main groove A2, the sipe is preferably made to communicate at one end with the main groove A1 and is made to communicate at the other end with the main groove A2; and in each block formed outside one of the shoulder-side main grooves A2, the sipe is preferably made to communicate at one end with the main groove A2 and is made to communicate at the other end with a corresponding contact end.

BEST MODES FOR CARRYING OUT THE INVENTION

Figure 1:
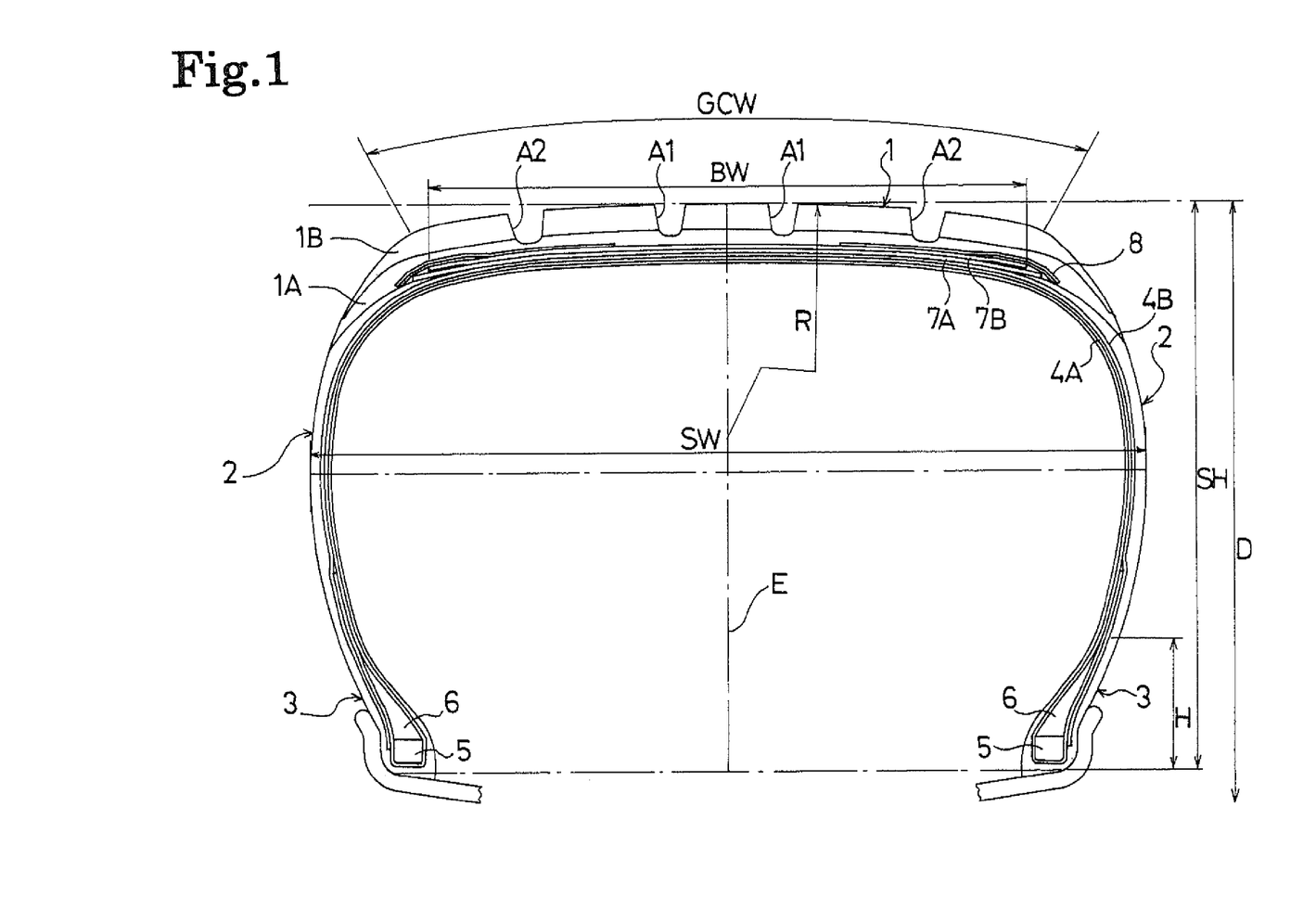
FIG. 1 is a meridian cross-sectional view showing a pneumatic tire according to an embodiment of the present invention.
Figure 2:
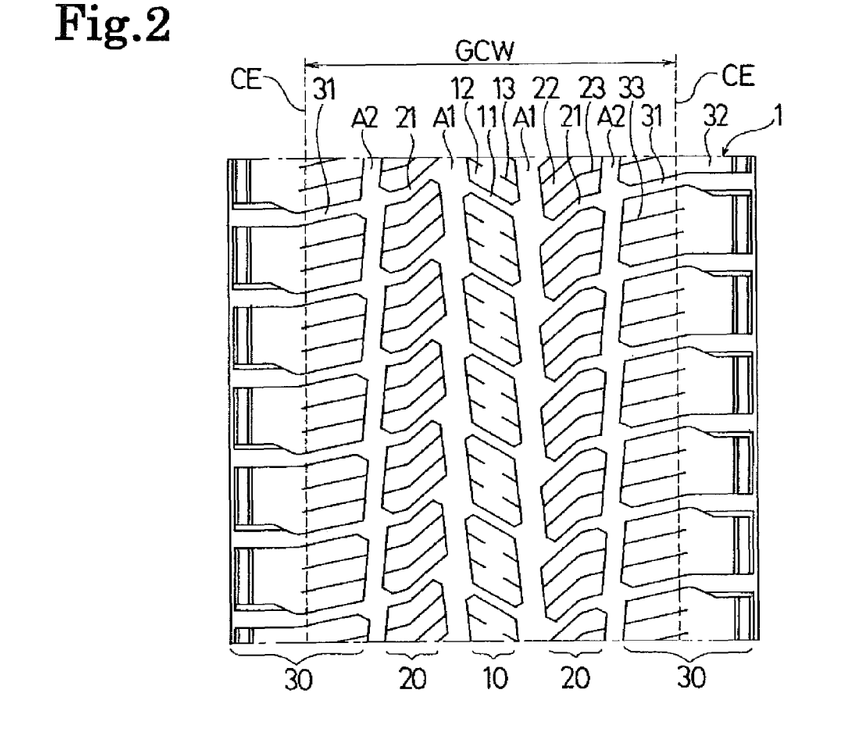
FIG. 2 is a development showing a tread pattern of the pneumatic tire according to the embodiment of the present invention.

Detailed descriptions will be hereinbelow provided for configurations of the present invention with reference to attached drawings. FIG. 1 is a meridian cross-sectional view showing a pneumatic tire according to an embodiment of the present invention. FIG. 2 is a development showing a tread pattern of the pneumatic tire.

In FIG. 1, reference numeral 1 denotes a tread section; 2, a sidewall section; and 3, a bead section. As shown in FIG. 1, two carcass layers 4A, 4B each including multiple paralleled carcass cords are laid between paired bead sections 3, 3. No specific restriction is imposed on the carcass cords. Nevertheless, it is desirable that organic fiber cords made of rayon, polyester, nylon, aromatic polyamide and the like should be used as the carcass cords. An angle of the cords in each of the carcass layers 4A, 4B to the tire circumferential direction is set in a range of 75° to 90°. End portions of the carcass layer 4A situated on the tire inner side are wound up around respective bead cores 5 from the inside to outside of the tire. Thus, bead fillers 6 placed on the bead cores 5 and made of rubber composition are wrapped with the end portions of the carcass layer 4A, respectively. On the other hand, end portions of the carcass layer 4B situated on the tire outer side are placed outside of the bead cores 5 and the bead fillers 6 in the tire width direction, respectively.

In the tread section 1, two belt layers 7A, 7B are arranged on the outer peripheral side of the carcass layers 4. Each of the belt layers 7A, 7B includes multiple reinforcement cords which is arranged obliquely to the tire circumferential direction. No specific restriction is imposed on the reinforcement cords of the belt layers 7A, 7B. Nevertheless, it is desirable that steel cords should be used as the reinforcement cords. In addition, at least one belt cover layer 8 is arranged on the outer peripheral side of the belt layers 7A, 7B. The belt cover layer 8 includes reinforcement cords oriented in the tire circumferential direction. In this respect, the belt cover layer 8 has a laminated structure in portions covering the end portions of the belt layer 7A and the end portions of the belt layer 7B, respectively. Moreover, the belt cover layer 8 has a single layer structure in a portion closer to the tire equator E. No specific restriction is imposed on the reinforcement cords included in the belt cover layer 8. Nevertheless, it is desirable that organic fiber cords made of polyester, nylon, aromatic polyamide and the like should be used as the reinforcement cords. In addition, the tread section 1 has a structure in which an under tread rubber layer 1A and a cap tread rubber layer 1B are laminated together.

As shown in FIG. 2, four main grooves A1, A1, A2, A2 are formed in the tread section 1. Each of the four main grooves A1, A1, A2, A2 extends in the tire circumferential direction, and has a see-through structure. In this respect, the two main grooves A1, A1 are situated on the tire equator side, while the two remaining main grooves A2, A2 are situated on the respective shoulder sides. The see-through structure means a structure in which a continuous space is formed when a main groove is projected in the tire circumferential direction. More specifically, even when the main grooves A1, A2 each have a zigzag shape as illustrated, a see-through portion remains at a widthwise center position of each main groove.

In the tread section 1, five rows of land portions 10, 20, 20, 30, 30 are formed by the four main grooves. Specifically, the land portion 10 is placed at the center position of the tread section 1; the land portions 20 are placed outside the land portion 10; and the land portions 30 are placed at the respective shoulder position of the tread section 1.

Multiple lug grooves 11 extending in the tire width direction are formed in the center land portion 10. The center land portion 10 is defined into multiple blocks 12 by these lug grooves 11. Multiple sipes 13 extending substantially in parallel to the lug grooves 11 are formed in each block 12. Note that the sipes mean fine grooves each with a groove width of 0.3 mm to 1.4 mm.

Furthermore, multiple lug grooves 21 extending in the tire width direction are formed in each of the land portions 20 situated outside the center land portion 10. Each land portion 20 is defined into multiple blocks 22 by these lug grooves 21. Multiple sipes 23 extending substantially in parallel to the lug grooves 21 are formed in each block 22.

Moreover, multiple lug grooves 31 extending in the tire width direction are formed in each of the shoulder land portions 30. Each shoulder land portion 30 is defined into multiple blocks 32 by these lug grooves 31. Multiple sipes 33 each extending substantially in parallel to the lug grooves 31 are formed in each block 32.

It should be noted that the above-described tread pattern satisfies the specification for snow tires which is provided by U.S. Rubber Manufacture Association (RMA). Specifically, each of the lug grooves 31 formed in the shoulder land portions 30: extends at least a half inches or more from one footprint end toward the tread center; has the groove width of $1/16$ inches or more; and has an inclination angle with respect to the tire circumferential direction in a range of 35° to 90°.

In the thus-configured pneumatic tire, the maximum groove depth of the main grooves A1, A2 are set in a range of 8.5 mm to 15.0 mm. When the maximum groove depth is set relatively large as described above, it is possible to extend the wear life, and to enhance the wet braking performance.

A ratio α of a section height SH of an actual tire to a section height $SH_{std}$ calculated from the tire size is set in a range of $0.97 \leq \alpha \leq 0.99$. Generally, in all-season tires, the groove depth is set large for the purpose of securing the snow performance and wear life. On the other hand, the section height SH is generally set larger than the section height $SH_{std}$. In the tire according to this embodiment, however, the section height SH is set relatively small on purpose. Thereby, the contact area ratio in the tire is optimized, and the average contact pressure P is controlled. The section height $SH_{std}$ (mm) calculated from the tire size is calculated by multiplying the nominal tire section width with the aspect ratio. On the other hand, the section height SH (mm) of the actual tire is obtained by measuring the tire which is mounted on a standard rim (major rim) and inflated to an air pressure of 200 kPa. Specifically, when an outer circumferential length (mm) of the tire inflated in a manner described above is measured and an outer diameter (mm) is calculated from the outer circumferential length, the section height SH of the actual tire can be obtained from (outer diameter−nominal rim diameter×25.4 mm)/2.

The above-described pneumatic tire is designed so that the contact area ratio is 65% to 70% and the average contact pressure P is 300 kPa to 400 kPa, under a measurement condition in which the tire is mounted on a standard rim (major rim), inflated to an air pressure of 200 kPa, and applied with a load which is 50% of the load carrying ability with the air pressure of 200 kPa. When the average contact pressure P is set larger than conventional, the wet braking performance can be enhanced without increasing the weight of the tire. In addition, when the outer diameter is set smaller, the footprint length becomes smaller. For this reason, it is possible to reduce the total frictional energy in the footprint, and accordingly to extend the wear life.

Figure 3:
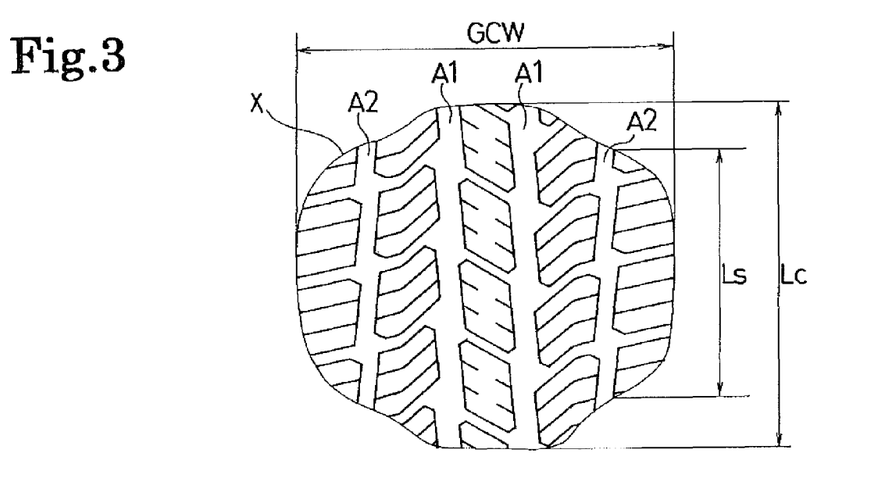
FIG. 3 is a plan view showing a contact region of the pneumatic tire according to the embodiment of the present invention.

FIG. 3 shows a contact region of the above-described pneumatic tire. In FIG. 3, the area of a region circled by a contact boundary line X is a contact area GCA, and the total area of contact portions in the region circled by the contact boundary line X is an actual contact area ACA. The contact area ratio can be obtained from ACA/GCA×100%. In addition, the average contact pressure P is a value obtained by dividing the applied load by the actual contact area ACA.

In the above-described pneumatic tire, the JIS-A hardness of cap compound constituting the tread section 1 is set in a range of 50 to 68 at 23° C. This makes it possible to achieve a higher level of balance between the wet braking performance and the wear life. Here, in a case where the JIS-A hardness of the cap compound is less than 50, the block rigidity is insufficient, and the wet braking performance accordingly deteriorates. Conversely, in a case where the JIS-A hardness of the cap compound exceeds 68, it is difficult to secure the wear life.

In the above-described pneumatic tire, the aspect ratio is set at 65% to 85%, and a ratio β of a maximum contact width GCW to a tire section width SW is set in a range of 0.60≤β≤0.70. This makes it possible to achieve a higher level of balance between the reduction of the tire weight and the wear life. Here, in a case where the ratio β is less than 0.60, the tread design width is too small, and it is accordingly difficult to secure the wear life. Conversely, in a case where the ratio β exceeds 0.70, it is difficult to reduce the weight of the tire.

As shown in FIG. 3, a maximum footprint length Ls of the shoulder land portion 30 situated in the shoulder of the tread section 1 and a maximum footprint length Lc of the center land portion 10 situated in the center of the tread section 1 satisfy a relationship of 0.80≤Ls/Lc≤0.95. This makes it possible to achieve a higher level of balance between the wet braking performance and the wear life. Here, in a case where a squareness ratio (Ls/Lc) is less than 0.80, the center wear increasingly tends to occur, and it is accordingly difficult to secure the wear life. Conversely, in a case where the squareness ratio exceeds 0.95, a contact performance cannot be sufficiently secured in the center region while braking. Accordingly, it is difficult to enhance the wet braking performance.

In the case of the above-described pneumatic tire, the section height SH is set in a range of 150 mm to 200 mm. This makes it possible to achieve a higher level of balance between the reduction of the tire weight and the wet braking performance. Here, in a case where the section height SH is less than 150 mm, the reduction of the tire weight is insufficient. Conversely, in a case where the section height SH exceeds 200 mm, the rigidity of the tire decreases. Accordingly, it is difficult to enhance the wet braking performance.

In the above-described pneumatic tire, an average tread radius R measured along a tire meridian and a tire outside diameter D satisfy a relationship of 0.70≤R/D≤0.90, more preferably 0.75≤R/D≤0.85. This makes it possible to achieve a higher level of balance between the wet braking performance and the wear life. Here, in a case where R/D is less than 0.70, the center wear increasingly tends to occur, and it is accordingly difficult to secure the wear life. Conversely, in a case where R/D exceeds 0.9, the contact performance cannot be sufficiently secured in the center region while braking. Accordingly, it is difficult to enhance the wet braking performance.

Note that the average tread radius R and the tire outside diameter D are those measured when the air pressure is 200 kPa. When the average tread radius R is measured, a radius gauge is placed in contact with the tread surface along a tire meridian. In that event, the measurement should be carried out in a way that all the land portions situated nearer to the center than the shoulder-side main grooves are put in contact with the radius gauge.

In the above-described pneumatic tire, the two belt layers 7A, 7B are buried in the tread section 1. A crossing angle between the cords in these belt layers 7A, 7B is set in a range of 44° to 52°. This makes it possible to achieve a higher level of balance between the wet braking performance and the wear life. Here, in a case where the cord crossing angle is less than 44°, the contact performance cannot be sufficiently secured in the center region while braking. Accordingly, it is difficult to enhance the wet braking performance. Conversely, in a case where the cord crossing angle exceeds 52°, the center wear increasingly tends to occur, and simultaneously the in-plane bending rigidity of each belt layer decreases. For this reason, it is difficult to secure the wear life.

In addition, a width BW of a portion where the belt layers 7A, 7B overlap each other and the maximum contact width GCW satisfy a relationship of 0.90≤BW/GCW≤1.00. This makes it possible to improve the wear life more. Here, in a case where BW/GCW is less than 0.90, the belt rigidity in each shoulder is insufficient, and a shoulder wear is likely to occur. Conversely, in a case where BW/GCW exceeds 1.00, the center wear increasingly tends to occur. Accordingly, it is difficult to secure the wear life.

In the above-described pneumatic tire, the bead fillers 6 are placed on the bead cores 5 in the bead sections 3, respectively. The height H of each bead filler 6 from the corresponding bead heel and the section height SH satisfy a relationship of 0.20≤H/SH≤0.30. When H/SH is set equal to or smaller than 0.30, it is possible to make the tire section width SW larger with a smaller rubber volume. Here, in a case where H/SH is less than 0.20, the rigidity of the tire decreases, and it is accordingly difficult to secure the driving stability. Conversely, in a case where H/SH exceeds 0.30, the weight of the tire is reduced insufficiently.

Figure 4:
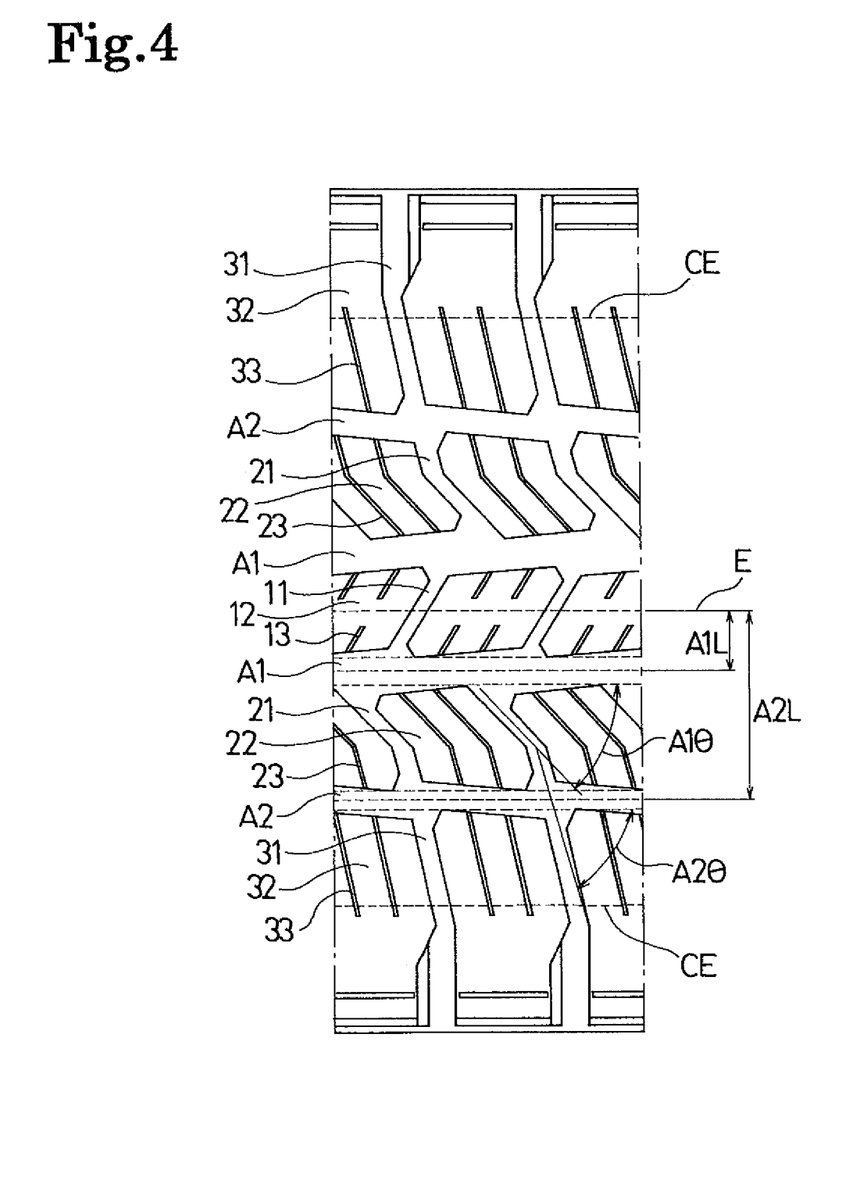
FIG. 4 is a magnified development showing a tread pattern of the pneumatic tire according to the embodiment of the present invention.

In the above-described pneumatic tire, the four main grooves A1, A2 having the see-through structure are formed in the tread section 1. As shown in FIG. 4, a distance AIL from the center position of one of the main grooves A1 situated on the tire equator side to the tire equator E and the maximum contact width GCW satisfy a relationship of $0.05 \leq A1L/GCW \leq 0.15$. In addition, a distance A2L from the center position of one of the main grooves A2 situated on the shoulder side to the tire equator E and the maximum contact width GCW satisfy a relationship of $0.25 \leq A2L/GCW \leq 0.40$. This makes it possible to achieve a higher level of balance between the wet braking performance and the wear life. Here, in a case where either A1L/GCW or A2L/GCW is too small, the tread rigidity in the center portion is insufficient, and the center wear is likely to occur. Accordingly, it is difficult to secure the wear life. Conversely, in a case where either A1L/GCW or A2L/GCW is too large, the groove area ratio in the center portion decreases, and the tread rigidity of each shoulder portion decreases. Accordingly, it is difficult to enhance the wet braking performance.

Although the main grooves A1, A2 each have the zigzag shape, it is desirable that: edges of the blocks 12, 22, 32 which face the main grooves should be shaped like a straight line; and a inclination angle of each edge to the tire circumferential direction should be 3° to 10°. A satisfactory edge effect can be obtained from this. Accordingly, it is possible to enhance the wet braking performance.

In the above-described pneumatic tire, the belt cover layers 8 are arranged on the outer peripheral side of the belt layers 7A, 7B in the tread section 1. One end portion of each belt cover layer 8 is placed outward of the belt layers 7A, 7B in the tire width direction. The other end portion of each belt cover layer 8 is placed in a region under the land portion 20 defined by the tire equator-side main groove A1 and the shoulder-side main groove A2. This makes it possible to optimize the contact patch shape and the distribution of the contact pressure, and accordingly to achieve a higher level of balance between the wet braking performance and the wear life. Note that it is desirable that the shortest distance from the edge of the belt cover layer 8, which is placed in the region under the land portion 20, to each of the main grooves A1, A2 should be set at 5 mm or more. In a case where this shortest distance is less than 5 mm, groove cracks are likely to occur.

In the above-described pneumatic tire, the multiple lug grooves 21 connecting the tire equator-side main grooves A1 and the shoulder-side main grooves A2 are formed. As shown in FIG. 4, the center line of each lug groove 21 includes two straight lines which cross each other. A crossing angle A1θ between the center line of the lug groove 21 and the main groove A1 (that is to say, a inclination angle of a main groove A1-side line segment of the center line of the lug groove 21 to the tire circumferential direction) is set in a range of 40° to 60°. A crossing angle A2θ between the center line of the lug groove 21 and the main groove A2 (that is to say, a inclination angle of a main groove A2-side line segment of the center line of the lug groove 21 to the tire circumferential direction) is set in a range of 60° to 80°. Thus, the block rigidity is secured, and the edge effect is optimized. Accordingly, a higher level of balance between the wet braking performance and the wear life can be achieved.

In the above-described pneumatic tire, the land portions 10, 20, 30 are made up respectively of the multiple blocks 12, 22, and 32. In these blocks 12, 22, and 32, the sipes 13, 23, 33 are formed. In each block 12 formed between the tire equator-side main grooves A1, A1, each sipe 13 is terminated at one end in the block 12 and is communicated at the other end with one of the main grooves A1. In each block 22 formed between one of the tire equator-side main grooves A1 and the corresponding shoulder-side main groove A2, each sipe 23 is communicated at one end with the main groove A1 and is communicated at the other end with the main groove A2. In each block 32 formed outside one of the shoulder-side main grooves A2, each sipe 33 is made to communicate at one end with the main groove A2 and is made to communicate at the other end with the corresponding contact end CE. Thus, the block rigidity is secured, and the edge effect is optimized. Accordingly, a higher level of balance between the wet braking performance and the wear life can be achieved.

The preferable embodiment of the present invention has been described in detail. It shall be understood that various modifications, substitutions and replacements can be applied to the present invention as long as the modifications, substitutions and replacements do not depart from the spirit and scope of the present invention defined by the attached scope of claims.

EXAMPLES

Pneumatic tires of Examples 1 to 6 were prepared as follows. Each of the pneumatic tires had a tire size of 265/70R16, a configuration shown in FIG. 1, and a tread pattern shown in FIG. 2. Specifications were set as shown in Table 1 for each of Examples 1 to 6, the specifications being: the maximum groove depth of the main grooves; the ratio α of the section height SH of the actual tire to the section height $SH_{std}$ calculated from the tire size; the ratio R/D of the average tread radius R to the tire outside diameter D; the contact area ratio under a measurement condition where the air pressure was 200 kPa, and the load was 50% of the load carrying ability with the air pressure of 200 kPa; the average contact pressure P under the above measurement condition; the ratio β of the maximum contact width GCW to the tire section width SW; and the ratio Ls/Lc of the maximum footprint length Ls of the shoulder land portion to the maximum footprint length Lc of the center land portion. For the comparison purpose, pneumatic tires (Conventional Example) having a conventional configuration were prepared with the same tire size.

These test tires were evaluated in terms of the tire weight, the wet braking performance and the wear life through the following test methods. The result of the evaluations is included in Table 1.

Tire Weight:

The weights of the test tires were measured. Inverse numbers of the respective measured values were used, and the result of the evaluation is shown by indexes where Conventional Example is taken as 100. A larger index means a lighter weight.

Wet Braking Performance:

The test tires were each fitted to a wheel with a rim size of 16×8.0 J, and the thus-fitted test tires were mounted to a vehicle (SUV) with an engine displacement of 3000 cc. Then, under a condition of the tires with an air pressure at 200 kPa, a braking distance was measured by applying brake while the vehicle was running at a speed of 120 km/h on a test course in a wet condition. Such measurement was conducted five times for each type of test tire, and the average braking distance was found. Inverse numbers of the respective measured values were used, and the result of the evaluation is shown by indexes where Conventional Example is taken as 100. A larger index means a better wet braking performance.

Wear Life:

The test tires were each fitted to a wheel with a rim size of 16×8.0 J, and the thus-fitted test tires were mounted to a vehicle (SUV) with an engine displacement of 3000 cc. Then, under a condition of the tires with an air pressure at 200 kPa, the vehicle ran 12000 km at an average speed of 40 km/h on the test course. After the run, the groove depths of the respective main grooves were measured. An estimated wear life was calculated on the basis of the depths of the grooves in a brand-new condition and the depths of the grooves in a worn-out condition. The result of the evaluation was indicated by index numbers. The result of the evaluation is shown by indexes where Conventional Example is taken as 100. A larger index means a longer wear life.

TABLE 1

|  | Conventional example | Example 1 | Example 2 | Example 3 | Example 4 | Example 5 | Example 6 |
|---|---|---|---|---|---|---|---|
| Maximum groove depth (mm) | 13 | 13 | 13 | 13 | 13 | 13 | 13 |
| $\alpha$ | 1.02 | 0.97 | 0.97 | 0.98 | 0.98 | 0.99 | 0.99 |
| R/D | 0.65 | 0.75 | 0.85 | 0.75 | 0.85 | 0.75 | 0.85 |
| Contact area ratio (%) | 68 | 68 | 68 | 68 | 68 | 68 | 68 |
| Average contact pressure P (kPa) | 292 | 380 | 370 | 350 | 340 | 320 | 310 |
| $\beta$ | 0.65 | 0.65 | 0.65 | 0.65 | 0.65 | 0.65 | 0.65 |
| Ls/Lc | 0.70 | 0.83 | 0.90 | 0.83 | 0.90 | 0.83 | 0.90 |
| Tire weight | 100 | 106 | 106 | 105 | 105 | 104 | 104 |
| Wet braking performance | 100 | 110 | 109 | 110 | 109 | 110 | 109 |
| Wear life | 100 | 104 | 105 | 105 | 106 | 106 | 107 |

As shown in Table 1, the tires according to Examples 1 to 6 were lighter in weight, better in wet braking performance, and longer in wear life than the tires according to Conventional Example.

EXPLANATION OF REFERENCE NUMERALS

1 tread section
1A under tread rubber layer
1B cap tread rubber layer
2 sidewall section
3 bead section
4, 4B carcass layer
5 bead core
6 bead filler
7A, 7B belt layer
8 belt cover layer
A1, A2 main groove
10, 20, 30 land portion
11, 21, 31 lug groove
12, 22, 32 block
13, 23, 33 sipe

What is claimed is:

1. A pneumatic tire in which: a carcass layer is laid between paired bead sections; a belt layer is buried, on the outer peripheral side of the carcass layer, in a tread section; and a plurality of main grooves extending in a tire circumferential direction, and a plurality of first lug grooves extending in a tire width direction are provided in the tread section, the pneumatic tire characterized in that:

a maximum groove depth of each of the main grooves is 8.5 mm to 15.0 mm, each one of a central land portion of the tire and a pair of adjacent land portions is made up of a plurality of blocks having edges which face the main grooves and which are shaped like a straight line, wherein an inclination angle of each of said block edges to the tire circumferential direction is in a range of 3 to 10 degrees, a ratio $\alpha$ of an actual section height SH of an actual tire to a calculated section height $SH_{std}$ calculated from a tire size is set in a range of $0.97 \leq \alpha \leq 0.99$, where the actual section height is the height of a tire mounted on a standard rim and inflated to an air pressure of 200 kPa, and is equal to one-half of (outer diameter in mm−(nominal rim diameter in inches×25.4 mm/inch)), a contact area ratio is 65% to 70% under a measurement condition where an air pressure is 200 kPa and a load is 50% of a load carrying ability with the air pressure of 200 kPa, a ratio $\beta$ of a maximum contact width GCW of the tread section to a tire section width SW is in a range of $0.60 \leq \beta \leq 0.70$, a maximum footprint length Ls of shoulder land portions in the footprint of the tire under the measurement condition, situated in respective shoulders of the tread section, and a maximum footprint length Lc of a center land portion in the footprint of the tire under the measurement condition situated in a center of the tread section satisfy a relationship of $0.80 \leq Ls/Lc \leq 0.90$, the plurality of first lug grooves are formed in the shoulder land portions, wherein each of said first lug grooves extend at least a half inch or more from one footprint end toward a tread center; has a groove width of 1/16 inches or more; and has an inclination angle with respect to the tire circumferential direction in a range of 35 to 90 degrees, an average contact pressure P is 300 kPa to 400 kPa under the measurement condition, and an aspect ratio is in a range of 75% to 85%.

2. The pneumatic tire according to claim 1, characterized in that a JIS-A hardness of a cap compound constituting the tread section is 50 to 68 at 23° C.

3. The pneumatic tire according to claim 1, characterized in that the section height SH of the actual tire is 150 mm to 200 mm.

4. The pneumatic tire according to claim 1, characterized in that an average tread radius R measured along a tire meridian and a tire outside diameter D satisfy a relationship of $0.70 \leq R/D \leq 0.90$.

5. The pneumatic tire according to claim 1, characterized by comprising two belt layers in the tread section, characterized in that a crossing angle of cords of these belt layers is 44° to 52°.

6. The pneumatic tire according to claim 1, characterized by comprising two belt layers in the tread section, characterized in that a width BW of a portion where these belt layers overlap each other and the maximum contact width GCW of the tread section satisfy a relationship of $0.90 \leq BW/GCW \leq 1.00$.

7. The pneumatic tire according to claim 1, characterized by comprising a bead filler on a bead core in each of the bead sections, characterized in that a height H of each bead filler from a bead heel and the section height SH of the actual tire satisfy a relationship of $0.20 \leq H/SH \leq 0.30$.

8. The pneumatic tire according to claim 1, characterized by comprising four main grooves in the tread section, each main groove having a see-through structure, characterized in that a distance A1L from a center position of one of the main grooves A1 situated on the tire equator side to the tire equator and the maximum contact width GCW of the tread section satisfy a relationship of $0.05 \leq A1L/GCW \leq 0.15$, and a distance A2L from a center position of one of the main grooves A2 situated on each shoulder side to the tire equator and the maximum contact width GCW satisfy a relationship of $0.25 \leq A2L/GCW \leq 0.40$.

9. The pneumatic tire according to claim 8, wherein the tread section comprises two belt layers, characterized by comprising a belt cover layer on an outer peripheral side of the belt layers in the tread section, characterized in that:

the belt cover is formed in a single layer structure in a portion of the belt cover located close to the tire equator, one end portion of the belt cover layer is placed outward of the belt layers in a tire width direction, and the other end portion of the belt cover layer is placed in a region under a land portion defined by one of the tire equator-side main grooves A1 and the corresponding shoulder-side main groove A2.

10. The pneumatic tire according to claim 8, characterized by comprising a plurality of lug grooves connecting the tire equator-side main grooves A1 and the shoulder-side main grooves A2, characterized in that:

a center line of each lug groove includes two straight lines which cross each other, a crossing angle $A1\theta$ between the center line of the lug groove and the corresponding main groove A1 is 40° to 60°, and a crossing angle $A2\theta$ between the center line of the lug groove and the corresponding main groove A2 is 60° to 80°.

11. The pneumatic tire according to claim 8, characterized in that each of five rows of land portions defined by the main grooves is made up of a plurality of blocks, a sipe is arranged in each of these blocks, in each block formed between the tire equator-side main grooves A1, A1, the sipe is terminated at the one end in the block and is made to communicate at the other end with one of the main grooves A1, in each block formed between one of the tire equator-side main grooves A1 and the corresponding shoulder-side main groove A2, the sipe is made to communicate at one end with the main groove A1 and is made to communicate at the other end with the main groove A2, and in each block formed outside one of the shoulder-side main grooves A2, the sipe is made to communicate at one end with the main groove A2 and is made to communicate at the other end with a corresponding contact end.

12. The pneumatic tire according to claim 1, wherein the maximum groove depth of each of the main grooves is 10.0 mm to 15.0 mm.

13. A pneumatic tire in which: a carcass layer is laid between paired bead sections; a belt section comprising two overlapping belt layers is buried, on the outer peripheral side of the carcass layer, in a tread section; and a plurality of main grooves extending in a tire circumferential direction, and a plurality of first lug grooves extending in a tire width direction are provided in the tread section, the pneumatic tire characterized in that a maximum groove depth of each of the main grooves is 8.5 mm to 15.0 mm, each one of a central land portion of the tire and a pair of adjacent land portions is made up of a plurality of blocks having edges which face the main grooves and which are shaped like a straight line, wherein an inclination angle of each of said block edges to the tire circumferential direction is in a range of 3 to 10 degrees, an actual section height SH of the tire is in a range between 150 mm to 200 mm, a ratio $\alpha$ of the actual section height SH to a section height $SH_{std}$ calculated from a tire size is set in a range of $0.97 \leq \alpha \leq 0.99$, where the actual section height SH is the height of a tire mounted on a standard rim and inflated to an air pressure of 200 kPa, and is equal to one-half of (outer diameter in mm−(nominal rim diameter in inches×25.4 mm/inch)), a ratio $\beta$ of a maximum contact width GCW of the tread section to a tire section width SW is in a range of $0.60 \leq \beta \leq 0.70$, a width BW of a portion where the belt layers overlap each other and the maximum contact width GCW of the tread section satisfy a relationship of $0.90 \leq BW/GCW \leq 1.00$, a contact area ratio is 65% to 70% under a measurement condition where an air pressure is 200 kPa and a load is 50% of a load carrying ability with the air pressure of 200 kPa, the plurality of first lug grooves are formed in the shoulder land portions, wherein each of said first lug grooves extend at least a half inch or more from one footprint end toward a tread center; has a groove width of 1/16 inches or more; and has an inclination angle with respect to the tire circumferential direction in a range of 35 to 90 degrees, an average contact pressure P is 300 kPa to 400 kPa under the measurement condition, and an aspect ratio is in a range of 75% to 85%.

14. The pneumatic tire according to claim 13, characterized by comprising four main grooves in the tread section, each main groove having a see-through structure, characterized in that a distance A1L from a center position of one of the main grooves A1 situated on the tire equator side to the tire equator and the maximum contact width GCW of the tread section satisfy a relationship of $0.05 \leq A1L/GCW \leq 0.15$, and a distance A2L from a center position of one of the main grooves A2 situated on each shoulder side to the tire equator and the maximum contact width GCW satisfy a relationship of $0.25 \leq A2L/GCW \leq 0.40$.

15. The pneumatic tire according to claim 14, characterized by comprising a belt cover layer on an outer peripheral side of the belt layers in the tread section, characterized in that:

the belt cover is formed in a single layer structure in a portion of the belt cover located close to the tire equator, one end portion of the belt cover layer is placed outward of the belt layers in a tire width direction, and the other end portion of the belt cover layer is placed in a region under a land portion defined by one of the tire equator-side main grooves A1 and the corresponding shoulder-side main groove A2.

16. The pneumatic tire according to claim 14, characterized by comprising a plurality of lug grooves connecting the tire equator-side main grooves A1 and the shoulder-side main grooves A2, characterized in that a center line of each lug groove includes two straight lines which cross each other, a crossing angle $A1\theta$ between the center line of the lug groove and the corresponding main groove A1 is 40° to 60°, and a crossing angle $A2\theta$ between the center line of the lug groove and the corresponding main groove A2 is 60° to 80°.

17. The pneumatic tire according to claim 14, characterized in that
- each of five rows of land portions defined by the main grooves is made up of a plurality of blocks,
- a sipe is arranged in each of these blocks,
- in each block formed between the tire equator-side main grooves A1, A1, the sipe is terminated at the one end in the block and is made to communicate at the other end with one of the main grooves A1,
- in each block formed between one of the tire equator-side main grooves A1 and the corresponding shoulder-side main groove A2, the sipe is made to communicate at one end with the main groove A1 and is made to communicate at the other end with the main groove A2, and
- in each block formed outside one of the shoulder-side main grooves A2, the sipe is made to communicate at one end with the main groove A2 and is made to communicate at the other end with a corresponding contact end.

* * * * *